No. 696,001. Patented Mar. 25, 1902.
V. H. BENDIX.
MOTOR CYCLE FRAME.
(Application filed July 6, 1901.)
(No Model.)
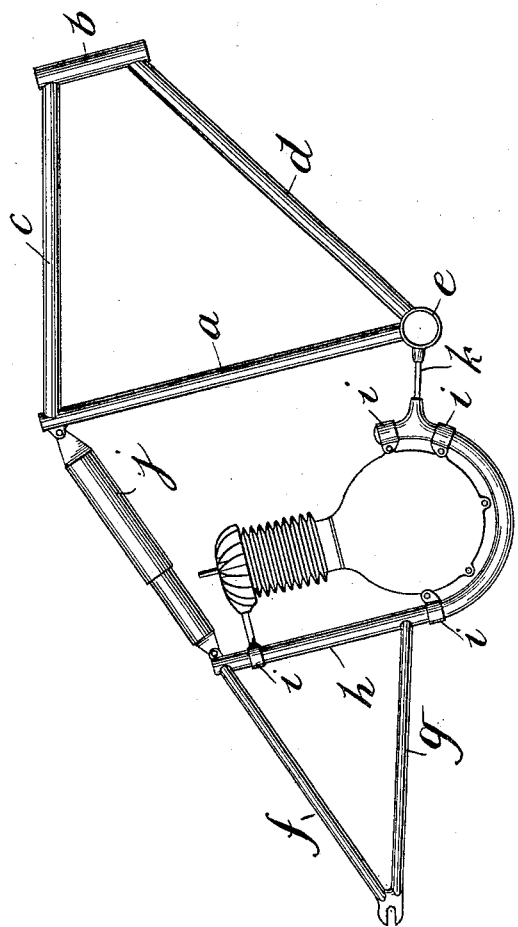
WITNESSES:
Harry Goss.
Geo. ...
INVENTOR
Vincent H. Bendix
BY
Seabury C. Mastick
his ATTORNEY
THE NORRIS PETERS CO., PHOTO-LITHO., WASHINGTON, D. C.

UNITED STATES PATENT OFFICE.

VINCENT H. BENDIX, OF NEW YORK, N. Y.

MOTOR-CYCLE FRAME.

SPECIFICATION forming part of Letters Patent No. 696,001, dated March 25, 1902.

Application filed July 6, 1901. Serial No. 67,262. (No model.)

*To all whom it may concern:*

Be it known that I, VINCENT H. BENDIX, a citizen of the United States, and a resident of the borough of the Bronx, New York city, New York, have invented certain new and useful Improvements in Motor - Cycle Frames, of which the following is a specification.

My invention relates to an improvement in motor-cycle frames, whereby the vibration caused by the motor is taken up and the objections heretofore existing to motor-cycles on this account largely done away with. The constant vibration caused by the motor is exceedingly unpleasant and in a rigid construction of frame, as heretofore, unavoidable. By my improvement I have produced a frame especially adapted for the seating of a motor, and with its members so connected that the vibration communicated from one to the other thereof is minimized.

I shall describe a structure embodying my invention, the features thereof being more particularly pointed out hereinafter in the claims.

The drawing shows a motor-cycle frame illustrating my improvement in side elevation.

*a* indicates the seat-post, and *b* the head; *c*, the top bar, and *d* the bottom bar connecting the seat-post and head, the bottom bar and seat-post being held in crank-bracket *e*, as shown, the whole constituting the front member of the frame.

*f* indicates the top rear bar, and *g* the bottom rear bar, the bars being connected at one end to the fork end and at the other to a cross-bar *h*, the whole constituting the rear member of the frame. The bar *h* forms a motor-support and is preferably curved forward at the bottom to form a seat for the motor, which may be attached thereto by any convenient means, such as by straps or bands *i i i i*. The front and rear members are connected by means adapted to confine the vibration of the motor to the rear member, such as springs *j* and *k*, spring *j* being preferaby of the cushion-spring type, pivoted at one end on bar *h* and at the other on seat-post *a*, and spring *k* being of any convenient type or a simple movable joint connected at one end to the bar *h* and at the other to the crank-bracket *e*.

The front member of the frame is prefer- ably rigid in construction, and the top and bottom rear bars are preferably rigidly connected to the bar *h*, the two members being connected together by springs or by a spring and a movable joint adapted to confine the vibration of the motor to the rear member thereof, as stated.

It is obvious that various types of connecting springs or joints may be used and that the form and shape of the members may be varied without departing from the spirit of my invention, and I do not desire to restrict myself to the details shown.

What I claim, and desire to secure by Letters Patent, is—

1. A motor-cycle frame having a front member provided with a seat for the rider and a rear member provided with a motor-support, the front and rear members being connected by means adapted to confine the vibration of the motor to the rear member.

2. A motor-cycle frame having a front member provided with a crank-bracket and with a seat for the rider and a rear member provided with a motor-support, the front and rear members being connected by means adapted to confine the vibration of the motor to the rear member.

3. A motor-cycle frame having a front member provided with a seat for the rider and a rear member having its fork ends connected by bars to a cross-bar adapted to form a motor-support, the front and rear members being connected by means adapted to confine the vibration of the motor to the rear member.

4. A motor-cycle frame having a front member provided with a seat for the rider and a rear member having its fork ends connected by bars to a cross-bar turned up at the bottom to form a seat and support for the motor, the front and rear members being connected by means adapted to confine the vibration of the motor to the rear member.

5. A motor-cycle frame having a front member consisting of a head, seat-post and connecting-bars held in place on the crank-bracket, and a rear member consisting of top and bottom bars connected to the fork ends and to a cross-bar turned up at the bottom to form a seat for a motor, the front and rear members being connected by springs connecting the motor-support and the seat-post at the top and the motor-support and the crank-bracket at the bottom, substantially as described.

6. A motor-cycle frame having a front member consisting of a head, seat-post and connecting-bars held in place on the crank-bracket and a rear member consisting of top and bottom bars connected to the fork ends and to a cross-bar curved forwardly at the bottom to form a seat for a motor, the front and rear members being connected at the top by a cushion-spring pivoted at one end on the motor-support and the other on the seat-post and at the bottom by a spring connected at one end to the forwardly-curved portion of the motor-support and at the other to the crank-bracket, substantially as described.

7. A motor-cycle frame having a front rigid member provided with a seat for the rider and a rear rigid member having its fork ends secured by bars to a cross-bar forming a motor-support, the rigid members being connected by means adapted to confine the vibrations of the motor to the rear member.

8. A motor-cycle frame having a front member provided with a seat for the rider and a rear member having its fork ends connected by bars to a cross-bar adapted to form a motor-support, the front and rear members being connected by yielding means forming a connection between the motor-support and the front member and adapted to confine the vibration of the motor to the rear member.

9. A motor-cycle frame having a front member provided with a seat-post supported by the crank-bracket and a rear member having its fork ends connected by bars to a cross-bar adapted to form a motor-support, the front and rear members being connected by yielding means forming a connection between the motor-support and the seat-post at the top and the motor-support and the crank-bracket at the bottom and adapted to confine the vibration of the motor to the rear member.

In witness whereof I have hereunto signed my name in the presence of two subscribing witnesses.

VINCENT H. BENDIX.

Witnesses:
   GEO. V. SMITH,
   SEABURY C. MASTICK.